United States Patent
Takahashi et al.

(10) Patent No.: US 6,485,795 B2
(45) Date of Patent: *Nov. 26, 2002

(54) METHOD AND APPARATUS FOR PRODUCING MAGNETIC RECORDING MEDIUM HAVING A LOW HEAT SHRINKAGE FACTOR

(75) Inventors: Shinsuke Takahashi, Odawara (JP); Toshio Miyashiro, Odawara (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,551

(22) Filed: Jul. 22, 1999

(65) Prior Publication Data

US 2002/0048637 A1 Apr. 25, 2002

(30) Foreign Application Priority Data

Jul. 22, 1998 (JP) .......................... 10-206756
Jul. 31, 1998 (JP) .......................... 10-217690

(51) Int. Cl.⁷ ...................... B05D 3/02; B05D 3/06; B05D 3/12
(52) U.S. Cl. ...................... 427/557; 427/128; 427/130; 427/172
(58) Field of Search ...................... 427/557, 559, 427/130, 172, 128, 131

(56) References Cited

U.S. PATENT DOCUMENTS

| | | | | |
|---|---|---|---|---|
| 4,473,619 A | * | 9/1984 | Porco | 427/128 |
| 4,481,231 A | * | 11/1984 | Hashimoto et al. | 427/128 |
| 4,720,412 A | * | 1/1988 | Katoh et al. | 428/141 |
| 4,728,577 A | * | 3/1988 | Yamada et al. | 427/128 |
| 5,182,153 A | * | 1/1993 | Miyake et al. | 428/64 |
| 5,192,584 A | * | 3/1993 | Miyashiro | 427/130 |
| 5,670,107 A | * | 9/1997 | Kuwahara et al. | 264/234 |
| 5,958,565 A | * | 9/1999 | Hattori et al. | 428/212 |
| 6,033,760 A | * | 3/2000 | Wakana et al. | 428/141 |

FOREIGN PATENT DOCUMENTS

| | | | |
|---|---|---|---|
| JP | 64-48225 | * | 2/1989 |
| JP | 1-109526 | * | 4/1989 |
| JP | 5-104054 | | 4/1993 |
| JP | 5-212337 | | 8/1993 |
| JP | 6-28668 | | 2/1994 |
| JP | 06028668 A | * | 2/1994 |
| JP | 7-7507 | | 1/1995 |
| JP | 8-133536 | | 5/1996 |
| JP | 9-44846 | | 2/1997 |

OTHER PUBLICATIONS

Derwent translation of JP 6–28668 A to Yoshida et al cited in paper #6, Feb. 1994.*
Japanese Abstract—Clipped Image of JP 401109526A to Matsutani et al., Apr. 26, 1989.*
Jap. Abst.—clipped Image of JP 401048225 A to Shimizu et al., Feb. 22, 1989.*
Derwent Abstract—Acc No. 1992–204587 of JP 04134628 A, May 8, 1992.*

* cited by examiner

*Primary Examiner*—Marianne Padgett
(74) *Attorney, Agent, or Firm*—Sughrue Mion, PLLC

(57) ABSTRACT

In a method for producing a magnetic recording medium, at least one magnetic layer is formed on a nonmagnetic support by coating. After all coating processes are completed, heat treatment is performed by heat-treating the support, which is undergone all the coating processes, at 95 to 140° C. for 1.0 to 10.0 seconds with continuously applying tension of from 1.0 to 4.0 kg/m to the support. Then, calendering process is performed at a temperature lower than the temperature of the heat treatment.

12 Claims, 4 Drawing Sheets

METHOD AND APPARATUS FOR PRODUCING MAGNETIC RECORDING MEDIUM HAVING A LOW HEAT SHRINKAGE FACTOR

BACKGROUND OF THE INVENTION

1. Field of the Invention

The present invention relates to a method and an apparatus for producing a magnetic recording medium.

2. Description of the Related Art

Accompanying with the increase of density of magnetic recording media in recent years, recording track has become extremely narrow. As a result, the dimensional stability of media themselves has been strongly desired. Particularly, this trend is more conspicuous in floppy disc type media in which symmetry is demanded in a circumferential direction.

Regarding to this kind of technique, Unexamined Japanese Patent Publication (kokai) Nos. 6-28668, 7-7507, 9-44846 and the like have been known.

Unexamined Japanese Patent Publication No. 6-28668 suggests conveying a tape-shaped medium at low tension with blowing hot air to the tape after coating process and calendering process for the purpose of heightening the dimensional stability of the medium and ensuring the productivity.

Unexamined Japanese Patent Publication No. 7-7507 discloses to increase dimensional stability for stabilizing the heat shrinkage of a floppy disc by heat-treating a medium punched into a doughnut-shaped pattern (called a cookie).

Unexamined Japanese Patent Publication No. 9-44846 discloses a technique of blowing hot air parallel to a web after film formation for smoothing with a view to preventing wrinkles of deposited film to thereby effect coating of a protecting layer in succeeding process.

However, the heat treatment method disclosed in Unexamined Japanese Patent Publication No. 9-44846 has a problem in the productivity. After a magnetic recording medium has been coated and dried, the web travels through winding-up process, the wound web is delivered and subjected to calendering process and winding-up process, the wound web is delivered and subjected to heat treatment and winding-up process. Thus, delivery and winding-up are repeated while the web is traveling through three processes. That is, the web is processed in processes of [delivery→coating winding→up]→[delivery→calendering process→winding-up]→[delivery→heat treatment→winding-up]. Therefore, wrinkles or the like are generated in the vicinity of the core of the web in each process, and a part of wrinkles is cut and discarded in the next process. Loss of the web increases due to this repetition. Further, a failure occurring due to winding-up results in the reduction of yield.

On the other hand, as to tape type media, the technique disclosed in Unexamined Japanese Patent Publication No. 6-28668 has effected the removal of heat shrinkage but some problems to be solved have been revealed to cope with higher density and disc type media in recent years. That is, although the technique is advantageous in that processing can be performed continuously and within extremely short period of time, this technique is not suitable to solve the anisotropy of dimensional stability. This is due to the mechanism that the stress relaxation in the transverse direction (TD) progresses extremely rapidly compared with that in the machine direction (MD) when a web is transported with applying a tension of about 0.15 kg/m. As a result, the balance of dimensional stability of the web is lost.

As a matter of course, the above collapse of balance is a serious problem not only to disc type media but also to other media such as high density tapes of late years where the accuracy of tracking in the transverse direction is required.

The technique of performing heat treatment in a cookie state as disclosed in Unexamined Japanese Patent Publication No. 7-7507 is good as technique itself but there is a problem in the productivity. That is, for the processing condition of from 60 to 80° C. for 5 hours or more as shown in the technique, large productivity cannot be expected. Therefore, in general, a plurality of cookies are to be piled and subjected to heat treatment. However, there are risks of uneven heat conduction due to piling, the deformation of cookies and the reduction of yield. Further, increasing the temperature for shortening the processing time has sometimes caused softening of the binder in the magnetic coating solution coated on media followed by the adhesion of coolies to each other, which leads to the reduction of yield.

Unexamined Japanese Patent Publication No. 9-44846 suggests conditions of heating a web with hot air along the machine direction as an effective heating means for improving dimensional stability of a magnetic recording medium but according to this technique, same as above, yield is deteriorated due to the repetition of delivery and winding-up.

SUMMARY OF THE INVENTION

It is an object of the present invention to solve the above-described problems in the conventional art, and to provide a method for producing a magnetic recording medium capable of improving dimensional stability of a magnetic recording medium without reducing the yield and an apparatus therefor.

It is another object of the present invention are to solve the above-described problems in the conventional art, and to provide a method which is capable of producing a magnetic recording medium having a low heat shrinkage factor and small anisotropy by adjusting the tension and heating conditions properly.

According to the first aspect of the present invention, in a method for producing a magnetic recording medium comprising at least one magnetic layer formed on a nonmagnetic support by coating, after all the coating processes have been completed, heat treatment is performed by heat-treating said support which has undergone all the coating processes at 95 to 140° C. for 1.0 to 10.0 seconds with continuously applying tension of from 1.0 to 4.0 kg/m, and then calendering process is performed at a temperature lower than the temperature of the foregoing heat treatment.

According to the second aspect of the present invention, an apparatus for producing a magnetic recording medium having at least one magnetic layer formed on a nonmagnetic support by coating comprises at least one coating part for performing all the coating processes including at least one magnetic layer of said support, a heat treatment unit for performing heat treatment of said support after having been coated with said magnetic layer with applying tension of from 1.0 to 4.0 kg/m at from 95° C. to 140° C. for from 1.0 to 10.0 seconds, and a calendering process part for performing calendering process at a lower temperature than the temperature of said heat treatment.

According to the third aspect of the present invention, an apparatus for producing a magnetic recording medium having at least one magnetic layer formed on a nonmagnetic support by coating comprises a coating part for coating said magnetic layer on said support, a drying zone for drying said coated magnetic layer, a heat treatment part for heat-treating said support after said magnetic layer has been dried, and tension setting means for independently setting the tension of said support at each processing part.

According to the fourth aspect of the present invention, a method for producing a magnetic recording medium comprises the steps of forming a magnetic layer on a nonmagnetic support to form a web of a magnetic recording medium, and heat-treating the traveling web of the magnetic recording medium, wherein the temperature of the web is in the range of 120° C. to 220° C., and the tension applied to the web is in the range of 0.05 kg/m to 3.0 kg/m.

According to the fifth aspect of the present invention, in the method for producing a magnetic recording medium of the fourth aspect, said web of the magnetic recording medium is a web of a disc-type medium.

According to the sixth aspect of the present invention, in the method for producing a magnetic recording medium of the fourth or fifth aspect, said heat treatment is heating by hot air.

According to the seventh aspect of the present invention, in the method for producing a magnetic recording medium of the fourth or fifth aspect, at least a part of a heating means is an infrared ray heating means.

In the present invention, the web which the coating and calendering has been completed is heat-treated under extremely low tension and high temperature. Thus, dimensional stability can be improved in a well-balanced state of anisotropy. Processing is more preferably performed at heating temperature of the web in the range of about 120 to 170° C. for 1 to 10 seconds. The tension is preferably in the range of 0.05 kg/m to 3.0 kg/m, but when higher anisotropy is required, it may be 0.05 kg/m or less, if possible.

DETAILED DESCRIPTION OF THE INVENTION

The present invention will be described as follows referring to the accompanying drawings.

Figure 1:
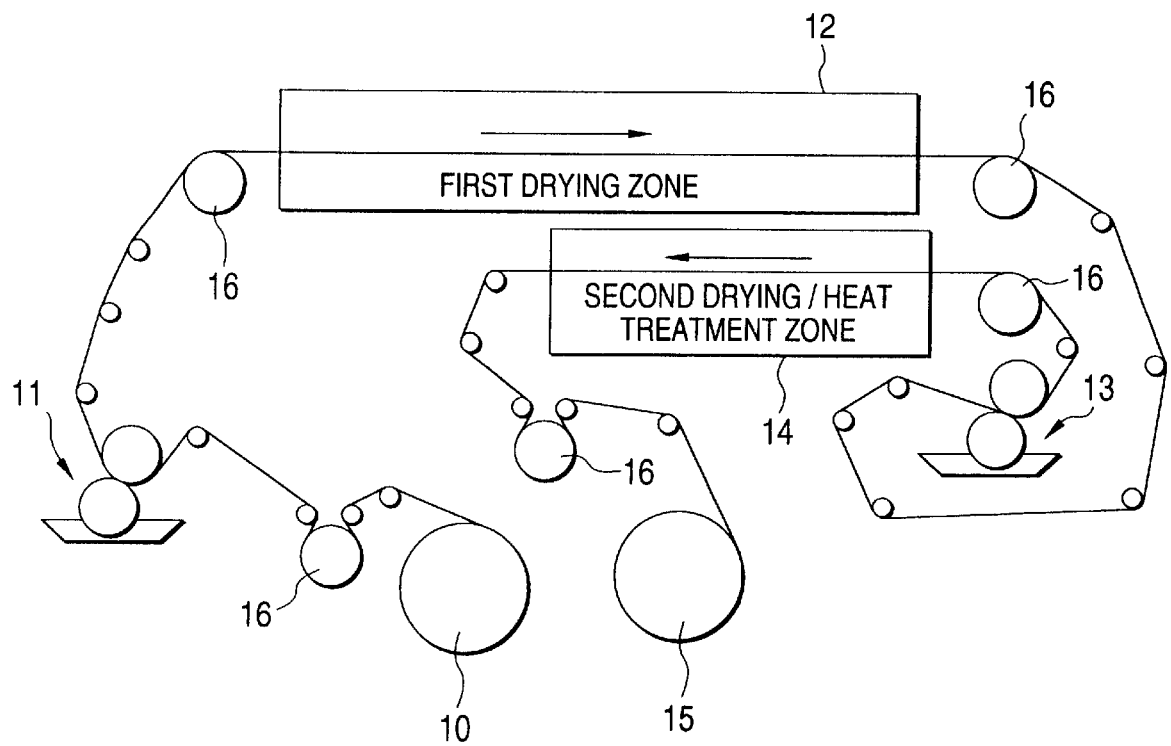
FIG. 1 is a schematic side view of the coating unit for a magnetic recording medium of the first embodiment of the present invention.

FIG. 1 is a schematic side view showing the coating unit of a magnetic recording medium of the first embodiment of the present invention.

In FIG. 1, reference numeral 10 designates a support delivery part; 11, a coating part for a magnetic layer; 12, a first drying zone; 13, a coating part for a back coating layer; 14, a second drying/heat treatment zone; 15, a winding-up part; and 16, a suction drum having grooves (as to details, see, e.g., Unexamined Japanese Patent Publication No. 8-133536). The surface of driving conveyance roller of a suction drum 16 are provided with a number of grooves along by the direction of the shaft and a number of through holes communicating with these grooves for sucking a support on the surface of driving conveyance drum. This is a conveying drum made negative pressure by suction from a drum shaft.

Further, the suction drums 16 are arranged between the support delivery part and coating part 11 for a magnetic layer, between the coating part 11 for a magnetic layer and the first drying zone 12, between the first drying zone 12 and the coating part 13 for a back coating layer, between the coating part 13 for a back coating layer 13 and the second drying/heat treatment zone 14, and between the second drying/heat treatment zone 14 and the winding-up movement 15, respectively, so that stable conveyance of a support (a magnetic recording medium) in this coating unit is realized.

That is, the coating unit shown in FIG. 1 makes it possible to set tension at different values in each processing zones between the support delivery part 10 and the coating part 11 for a magnetic layer, between the coating part 11 for a magnetic layer and the first drying zone 12, between the first drying zone 12 and the coating part 13 for a back coating layer, between the coating part for a back coating layer and the second drying/heat treatment zone 14, and between the second drying/heat treatment zone 14 and the winding-up movement 15, by adjusting the sliding condition on drum 16 by controlling suction force and rotary speed of the suction drum having grooves. Therefore, the optimal tension for process in each processing zone can be maintained stably and not only stable conveyance can be realized but also each process can be performed most effectively. Such a system of adjusting the tension of a support is in general called a draw system. A system called a dancer system can be applied as well. A dancer system uses dancer roller which gives desired pressure to a support and adjusts a rotation speed of a driving roller, such as a suction drum with grooves, etc., to make the position of the dancer roller prescribed position. Still other systems can be used.

Figure 2:
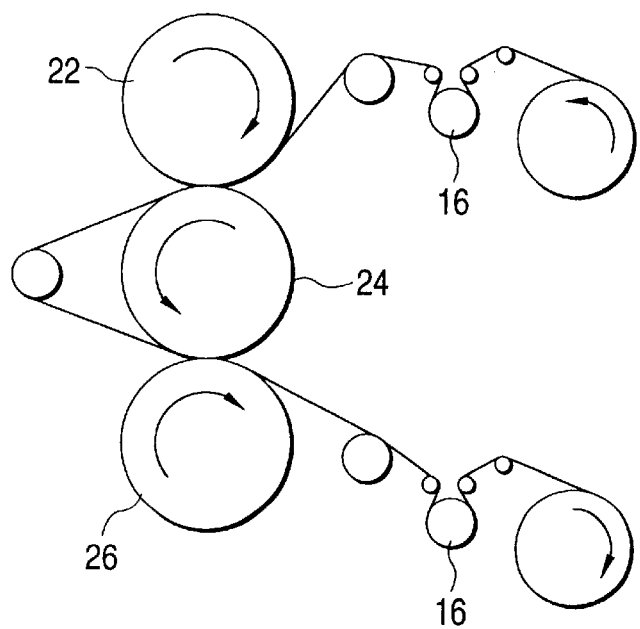
FIG. 2 is a schematic side view of a calender unit.

A support coated with a magnetic layer by a coating unit shown in FIG. 1 is then subjected to calendering process using a calendering unit shown in FIG. 2. The calendering unit is provided as different unit from the coating unit shown in FIG. 1. A support coated with a magnetic layer by a coating unit shown in FIG. 1 is installed in a calendering unit in a wound state. The support is again let out from the wound state and calender-processed by being conveyed between calender rollers 22, 24 and 26, and then again wound in a roll. The tension of the support during calender processing is appropriately adjusted by suction drum having grooves 16 installed in the calendering unit.

Figure 3:
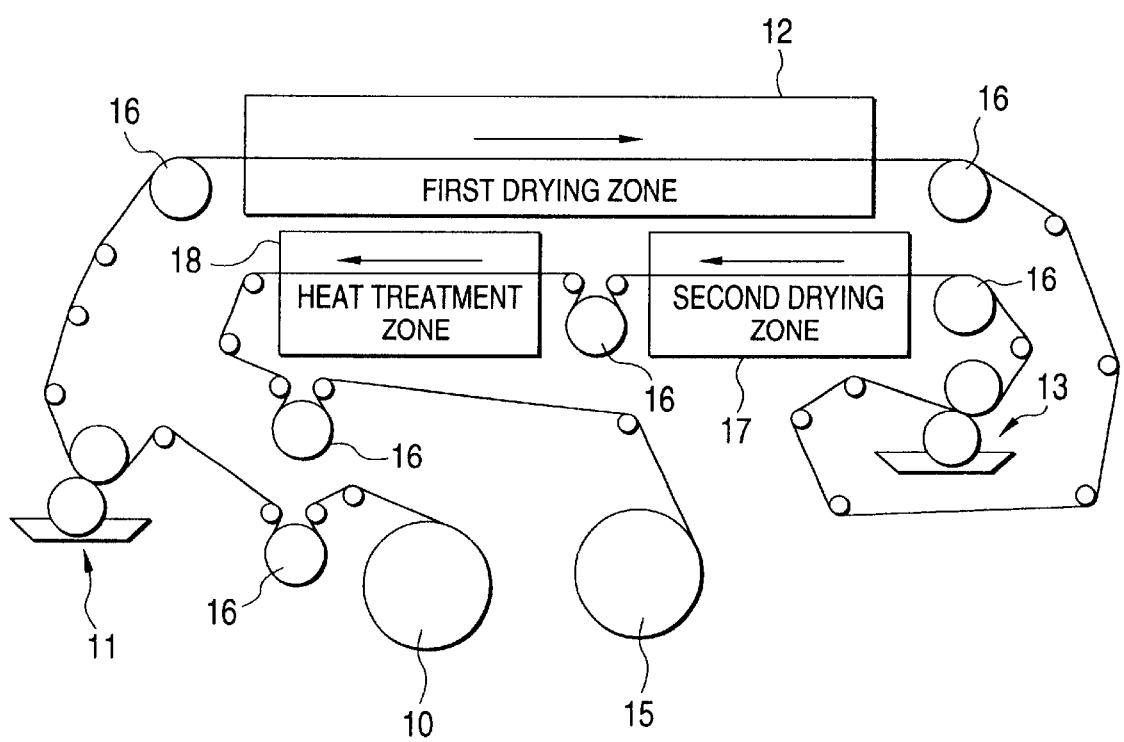
FIG. 3 is a schematic side view of the coating unit for a magnetic recording medium of the second embodiment of the present invention.

FIG. 3 is a drawing of a coating unit of a magnetic recording medium in the second embodiment of the present invention.

In the second embodiment, the same constitutions as in FIG. 1 are marked with the same symbols and explanation thereof is omitted, and only different parts are explained.

In the first embodiment, second drying/heat treatment zone 14 is constituted as one unit but in the second embodiment second drying zone 17 and heat treatment zone 18 are independently constituted. A support coated with a back coating layer at coating part of a back coating layer 13 enters second drying zone 17, where the back coating layer is dried, then subjected to heat treatment at heat treatment zone 18, and wound.

The support coated with a magnetic layer by a coating unit shown in FIG. 3 is then calender-processed by a calendering unit shown in FIG. 2 same as in the first embodiment.

In the first and second embodiments, calendering unit and coating unit are provided as different units and processing is performed by the step of [delivery→coating heat→treatment→winding-up/delivery→calender processing], but calendering unit and coating unit may be a unit. That is, the coating unit may be constituted as the step of [delivery→coating→heat treatment→calender processing→winding up] and the support which has been undergone all the coating process may be heat-treated and then calender-processed without being wound-up.

EXAMPLE/COMPARATIVE EXAMPLE 1

A magnetic recording medium (web) having the following composition was prepared as Example/Comparative Example 1 using the coating unit shown in FIG. 1.

Base

A PEN base having a width of 550 mm and a thickness of 9 μm.

Magnetic Layer

Coating solution 1 and coating solution 2 each having the following composition were double layer-coated in a dry thickness of 1.2 μm and 0.2 μm, respectively.

Coating Solutions

The following two solutions were used as coating solutions.

Various levels of heat treatment conditions and tension values were set and comparison was conducted.

| Coating Solution 1 | |
|---|---|
| Inorganic powder (TiO$_2$) (average primary particle size: 0.05 μm, specific surface area S$_{BET}$: 18 m$^2$/g) | 100 weight parts |
| Carbon black (average primary particle size: 0.018 μm) | 20 weight parts |
| Vinyl chloride/vinyl acetate/vinyl alcohol copolymer | 12 weight parts |
| Polyester urethane resin | 5 weight parts |
| Butyl stearate | 1 weight part |
| Stearic acid | 1 weight part |
| Methyl ethyl ketone | 200 weight parts |
| Coating Solution 2 | |
| Ferromagnetic metal fine powder (composition: Fe/Zn/Ni = 92/4/4) (Hc: 2,000 Oe, specific surface area (S$_{BET}$): 58 m$^2$/g, acicular ratio: 5.0) | 100 weight parts |
| Vinyl chloride/vinyl acetate copolymer (polymerization degree: 300) | 12 weight parts |
| Polyester polyurethane resin | 3 weight parts |
| α-Alumina (particle size: 0.5 μm) | 1 weight part |
| Carbon black (particle size: 0.1 μm) | 1.5 weight parts |
| Butyl stearate | 0.5 weight part |
| Stearic acid | 1 weight part |
| Methyl ethyl ketone | 200 weight parts |

Back Coating Layer

Coating solution for a back coating layer having the following composition was coated in a dry thickness of 0.5 μm.

| Coating Solution for Back Coating Layer | |
|---|---|
| Carbon black ((S$_{BET}$): 20 m$^2$/g, average particle size: 17 μm) | 100 weight parts |
| Nitrocellulose RS 1/2 | 100 weight parts |
| Polyester polyurethane | 30 weight parts |
| Dispersant | |
| Copper phthalocyanine | 10 weight parts |
| Copper phthalocyanine | 10 weight parts |
| Barium sulfate (precipitating) | 5 weight parts |
| Methyl ethyl ketone | 500 weight parts |
| Toluene | 500 weight parts |

The above solutions were kneaded and dispersed, and a back coating layer solution was prepared by the following prescription.

| | |
|---|---|
| Above solution | 100 weight parts |
| Carbon black, (S$_{BET}$: 200 m$^2$/g average particle size: 200 μm) | 100 weight parts |
| α-Al$_2$O$_3$ (average particle size: 0.2 μm) | 0.1 weight part |

Measuring Method

A sample is cut to a piece of 150 mm×12.54 mm strip and marked at an interval of about 100 mm in the machine direction. After the interval between these marks is measured by a comparator, the sample attached with a dead weight of 10 g is placed in a dry oven set at 100° C. for 1 hour. After the sample is taken out of the oven, the foregoing intervals marked are measured and the variation is defined as a heat shrinkage factor. The objective shrinkage factor in this sample is 0.03%.

A web was subjected to magnetic layer coating/heat treatment using the coating unit shown in FIG. 1, then the sample was once wound and immediately calender-processed with a twin roller. As a heat treatment zone, first drying zone and second drying zone of the coating unit were used. Heat treatment was performed with varying the tension. After heat treatment, calender processing was performed to thereby a sample as described above was prepared. The results of evaluations are shown in Table 1 below. In Table 1, columns enclosed with thick frames are out of the embodiment of the present invention.

An allowable heat shrinkage factor is 0.05%. Those having a hear shrinkage of 0.05 or less are indicated by "○" and those exceeding 0.05 are indicated by "×".

(3) If the calender processing temperature is not lower than the heat treatment temperature, a heat shrinkage factor is deteriorated.

(4) Heat treatment is preferably conducted after all the processes have been completed. If heat treatment is conducted in the first drying zone, it is stretched by drying of a back coating layer, which is ineffective.

As described above, the effect of the present invention is apparent.

Moreover, the foregoing modes of executions are only a few of the examples and the present invention is not limited thereto.

For example, in the above examples, a web was subjected to magnetic layer coating/heat treatment, then the sample

TABLE 1

| No. | Heat Treatment Zone | Tension (kg/m) | Processing Time (sec) | Processing Temperature (° C.) | Calendering Temperature (° C.) | Heat Shrinkage Factor (%) | Evaluation |
|---|---|---|---|---|---|---|---|
| 1 | 2nd drying zone | 3.0 | 5.0 | 120 | 90 | 0.036 | o |
| 2 | 2nd drying zone | 4.0 | 5.0 | 120 | 90 | 0.050 | o |
| 3 | 2nd drying zone | 5.0 | 5.0 | 120 | 90 | 0.12 | x |
| 4 | 2nd drying zone | 3.0 | 1.0 | 120 | 90 | 0.048 | o |
| 5 | 2nd drying zone | 3.0 | 3.0 | 120 | 90 | 0.042 | o |
| 6 | 2nd drying zone | 3.0 | 10.0 | 120 | 90 | 0.033 | o |
| 7 | 2nd drying zone | 3.0 | 5.0 | 90 | 90 | 0.080 | x |
| 8 | 2nd drying zone | 3.0 | 5.0 | 95 | 90 | 0.045 | o |
| 9 | 2nd drying zone | 3.0 | 5.0 | 100 | 90 | 0.042 | o |
| 10 | 2nd drying zone | 3.0 | 5.0 | 140 | 90 | 0.035 | o |
| 11 | 2nd drying zone | 3.0 | 5.0 | 120 | 110 | 0.041 | o |
| 12 | 2nd drying zone | 3.0 | 5.0 | 120 | 130 | 0.095 | x |
| 13 | 2nd drying zone | 3.0 | 5.0 | 100 | 60 | 0.043 | o |
| 14 | 2nd drying zone | 3.0 | 5.0 | 100 | 110 | 0.098 | x |
| 15 | 1st drying zone | 3.0 | 5.0 | 120 | 60 | 0.22 | x |

Incidentally, if the heat processing temperature is 150° C. or more, the web was deformed and it was impossible to measure the heat shrinkage factor.

The following facts can be seen from the above Example/Comparative Example 1.

(1) The processing temperature should be high (95° or more). If the processing temperature is lower than 95° C., the effect of the present invention cannot be expected, however prolonged the processing time may be.

(2) The processing tension should be low (4.0 kg/m or less). If the tension is more than 4.0 kg/m, the effect of the present invention cannot be expected.

was once wound and immediately calender-processed with a twin roller, but processing from coating to calendering can be performed continuously without winding-up the web.

Further, an example of preparation of a magnetic recording medium having one magnetic layer has been shown in the above example, but the present invention can be applied to the case comprising a plurality of magnetic layers.

For example, multilayer extrusion coating apparatuses disclosed in Unexamined Japanese Patent Publication Nos. 5-104054 and 5-212337 by the present inventors can be exemplified as multilayer coating apparatuses which can be preferably used in such a case.

As explained in detail above, according to the present invention, after all the coating processes containing at least one magnetic layer have been completed, by heat-treating the support, which has undergone all the coating processes, at 95 to 140° C. for 1 to 10 seconds with continuously applying tension of from 1.0 to 4.0 kg/m, and then performing calendering process at a temperature lower than the temperature of the foregoing heat treatment, a magnetic recording medium having a low heat shrinkage factor can be effectively obtained.

Moreover, by the provision of a tension setting unit between each process part, a support can be processed with setting an appropriate tension in each processing part.

Third embodiment of the present invention will be described in detail below with referring to preferred examples.

A web of a magnetic recording medium was prepared as follows.

Base

A PEN base having a width of 550 mm and a thickness of 62 μm.

Magnetic Layer

Coating solution 1 and coating solution 2 each having the following composition were double layer-coated in a dry thickness of 1.9 μm and 0.4 μm, respectively. Both surfaces were coated in the same manner to obtain a web.

Coating Solutions

The following two solutions were used as coating solutions.

| Coating Solution 1 (for a non-magnetic layer) | |
|---|---|
| Inorganic powder (TiO$_2$) (average primary particle size: 0.05 μm, specific surface area S$_{BET}$: 18 m$^2$/g) | 100 weight parts |
| Carbon black (average primary particle size: 0.018 μm) | 20 weight parts |
| vinyl chloride/vinyl acetate/vinyl alcohol copolymer | 12 weight parts |
| Polyester urethane resin | 5 weight parts |
| Butyl alcohol | 1 weight part |
| Stearic acid | 1 weight part |
| Methyl ethyl ketone | 200 weight parts |
| Coating Solution 2 (for a magnetic layer) | |
| Ferromagnetic metal fine powder (composition: Fe/Zn/Ni = 92/4/4) (HC: 2,000 Oe, specific surface area (S$_{BET}$): 58 m$^2$/g, acicular ratio: 5.0) | 100 weight parts |
| Vinyl chloride/vinyl acetate copolymer (polymerization degree: 300) | 12 weight parts |
| Polyester polyurethane resin | 3 weight parts |
| α-Alumina (particle size: 0.5 μm) | 1 weight part |
| Carbon black (particle size: 0.1 μm) | 1.5 weight parts |
| Butyl stearate | 0.5 weight part |
| Stearic acid | 1 weight part |
| Methyl ethyl ketone | 200 weight parts |

Coating Unit

Figure 4:
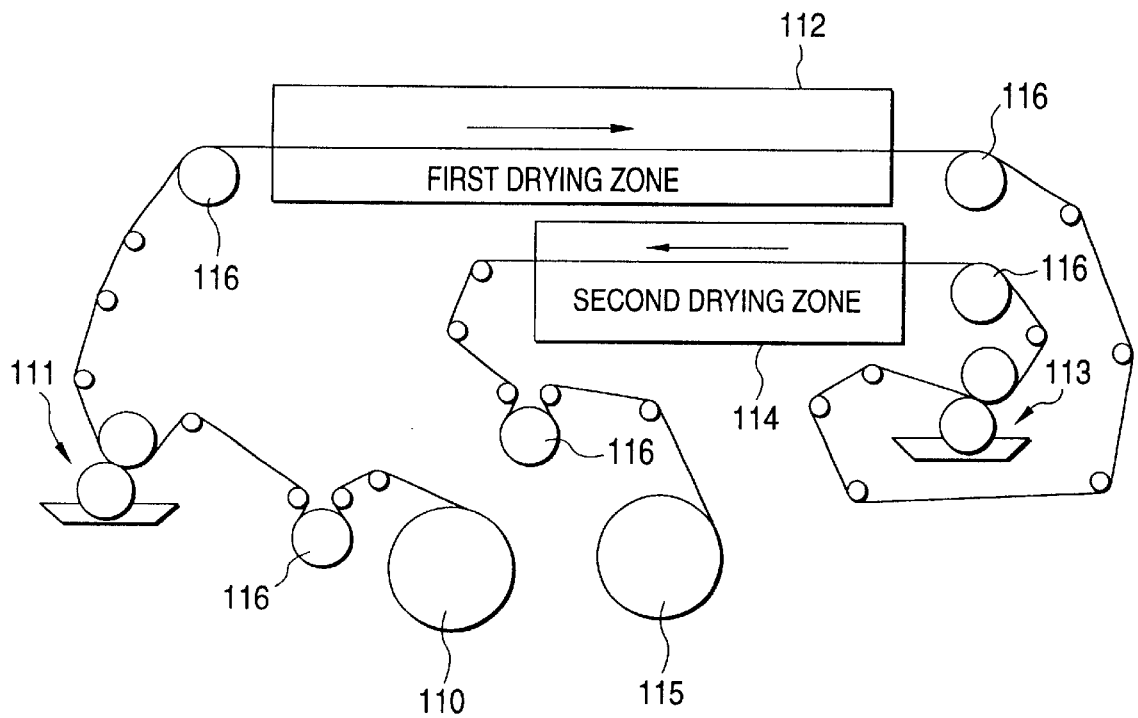
FIG. 4 is a schematic view of a coating unit used in a third embodiment.

A coating unit as shown in FIG. 4 generally used in a manufacturing apparatus of magnetic recording media was used. In FIG. 4, reference numeral 110 designates a support delivery part; 111, a coating part for a magnetic layer; 112 a first drying zone; 113, a coating part for a back coating layer; 114, a second drying zone; 115, a winding-up part, and 116, a suction drum having grooves (as to details, see, e.g., Unexamined Japanese Patent Publication No. 8-133536). Further, the suction drum 116 is arranged between the support delivery part 110 and the coating part 111 for a magnetic layer, between the coating part 111 of a magnetic layer and the first drying zone 112, between the first drying zone 112 and the coating part 113 of a back coating layer, between the coating part 113 for a back coating layer and the second drying zone 114, and between second drying zone 114 and the winding-up unit 115, respectively, so that stable transporting of a support (a magnetic recording medium) in this coating unit is realized. Incidentally, the mode of each coating zone and the utilization of each coating zone are properly selected so as to correspond to the shape and the kind of the medium to be coated.

Measuring Method

A sample is cut to a piece of 150 mm square and marked at an interval of about 100 mm in the machine direction (MD) and the transverse direction (TD). After these intervals are measured by a comparator, the sample is placed in a dry oven fixed at 100° C. for 1 hour. After the sample is taken out of the oven, the foregoing intervals marked are measured and the variation is defined as a heatshrinkage factor. The difference between heat shrinkages (MD–TD) is defined as anisotropy.

Example/Comparative Examples are shown below.

EXAMPLE/COMPARATIVE EXAMPLE 2

Figure 5:
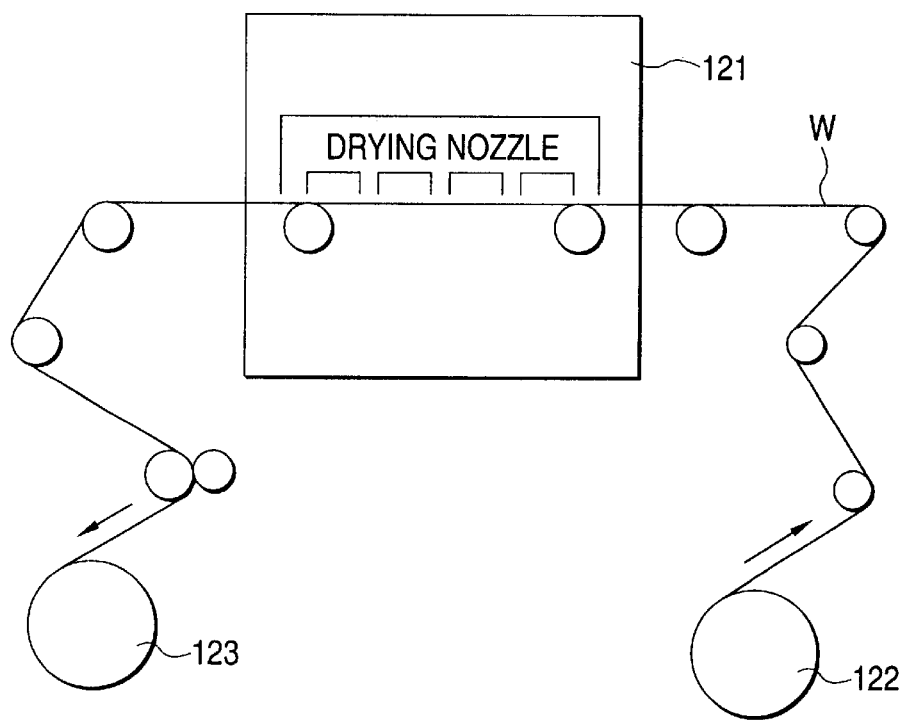
FIG. 5 is a schematic view of a hot air processing unit used in the third embodiment.

Heat treatment was carried out using a hot air processing unit shown in FIG. 5. The above prepared magnetic recording medium, web W, was transported with maintaining the prescribed tension and passed through chamber 121 heated by hot air. Thus, heat treatment was performed. Here, the heat shrinkage factor in each processing condition was measured with varying the hot air temperature, passing rate and tension as shown in the following Table 2. In FIG. 5, reference numeral 122 designates a web delivery part, and 123 designates a winding-up unit of a processed web. The temperature of web W measured by a thermo-couple from the back side (hot air wing side) of web W.

The results obtained are shown in Table 2 below. In Table 2, columns enclosed with thick frames are out of the embodiment of the present invention. An allowable heat shrinkage factor in the MD direction is 0.20% and allowable anisotropy is 0.17%. Those less than the allowable value are indicated by "○" and those not lower than the allowable value are indicated by "×".

TABLE 2

| No. | Temperature of Web (° C.) | Tension (kg/m) | Processing Time (sec) | Heat Shrinkage Factor: MD(%) | Heat Shrinkage Factor: TD(%) | MD-TD (%) | Evaluation |
|---|---|---|---|---|---|---|---|
| 1 | 140 | 0.5 | 4.0 | 0.011 | 0.005 | 0.006 | o |
| 2 | 140 | 1.0 | 4.0 | 0.015 | 0.005 | 0.010 | o |
| 3 | 140 | 2.0 | 4.0 | 0.018 | 0.002 | 0.016 | o |
| 4 | 140 | 3.0 | 4.0 | 0.020 | 0.000 | 0.020 | o |
| 5 | 140 | 5.0 | 4.0 | 0.028 | -0.029 | 0.057 | MD, anisotropy x |
| 6 | 100 | 1.0 | 1.0 | 0.088 | 0.018 | 0.070 | MD, anisotropy x |
| 7 | 100 | 1.0 | 4.0 | 0.055 | 0.013 | 0.042 | MD, anisotropy x |
| 8 | 100 | 1.0 | 10.0 | 0.030 | 0.015 | 0.015 | MDx |
| 9 | 115 | 1.0 | 1.0 | 0.055 | 0.012 | 0.043 | MD, anisotropy x |
| 10 | 115 | 1.0 | 4.0 | 0.028 | 0.010 | 0.018 | MD, anisotropy x |
| 11 | 120 | 1.0 | 1.0 | 0.019 | 0.007 | 0.012 | o |
| 12 | 120 | 1.0 | 4.0 | 0.016 | 0.006 | 0.010 | o |
| 13 | 160 | 1.0 | 0.8 | 0.019 | 0.007 | 0.012 | o |
| 14 | 160 | 1.0 | 1.0 | 0.018 | 0.005 | 0.013 | o |
| 15 | 160 | 1.0 | 3.0 | 0.014 | 0.003 | 0.011 | o |

The following facts can be seen from the above Example/Comparative Example 2.

(1) The processing temperature should be high (120° or more). If the processing temperature is lower than 120°C., the effect of the present invention cannot be expected, however prolonged the processing time may be.

(2) The processing tension should be low (3.0 kg/m or less). If the tension is 3.0 kg/m or more, the anisotropy is deteriorated.

(3) Provided that the conditions are within the above range, optimal conditions can be obtained in the "category of condition selection". For example, if the temperature is high, the processing time can be shortened the more.

EXAMPLE/COMPARATIVE EXAMPLE 3

Figure 6:
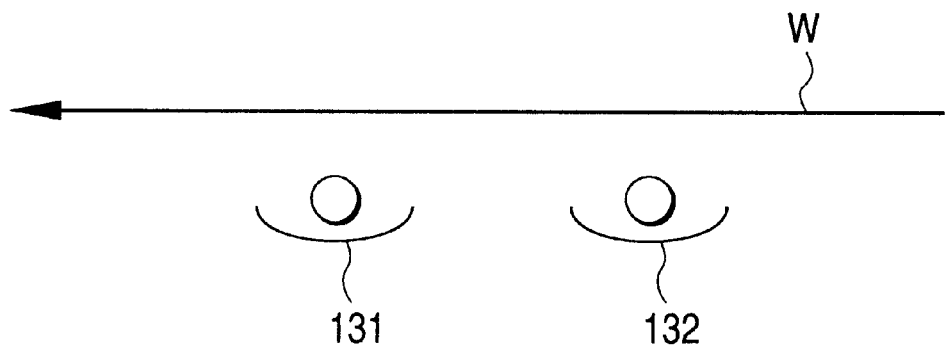
FIG. 6 is a schematic view of an example of a heating unit used in the third embodiment.

The above prepared web of recording medium was heat-treated using short wavelength infrared ray radiators. Web W was transported with maintaining the tension constant as shown in FIG. 6. In FIG. 6, W shows a web to be processed, and reference numerals 131 and 132 designate short wavelength infrared ray radiators for heating. The temperature of web W was measured by an infrared radiation thermometer that corresponds to a measurement wavelength different from the radiator output wavelength from the side where the radiator for web W was installed.

The results obtained are shown in Table 3 below.

TABLE 3

| No. | Temperature of Web (° C.) | Tension (kg/m) | Processing Time (sec) | Heat Shrinkage Factor: MD (%) | Shrinkage Factor: TD (%) | MD-TD (%) | Evaluation |
|---|---|---|---|---|---|---|---|
| 1 | 160 | 0.5 | 1.0 | 0.012 | 0.008 | 0.004 | o |
| 2 | 160 | 1.0 | 1.0 | 0.018 | 0.003 | 0.015 | o |
| 3 | 180 | 0.5 | 0.8 | 0.010 | 0.004 | 0.006 | o |
| 4 | 180 | 0.5 | 1.5 | 0.008 | 0.001 | 0.007 | o |

TABLE 3-continued

| No. | Temperature of Web (° C.) | Tension (kg/m) | Processing Time (sec) | Heat Shrinkage Factor: MD (%) | Shrinkage Factor: TD (%) | MD-TD (%) | Evaluation |
|---|---|---|---|---|---|---|---|
| 5 | 180 | 2.0 | 1.5 | 0.014 | 0.002 | 0.012 | ○ |
| 6 | 180 | 5.0 | 1.5 | 0.018 | −0.022 | 0.040 | anisotropy x |

The following facts can be seen from the above Example/Comparative Example 3.

(1) Processing with higher temperature and shorter processing time becomes possible due to infrared heating.

(2) Higher tension results in a disadvantageous effect.

EXAMPLE/COMPARATIVE EXAMPLE 4

Figure 7:
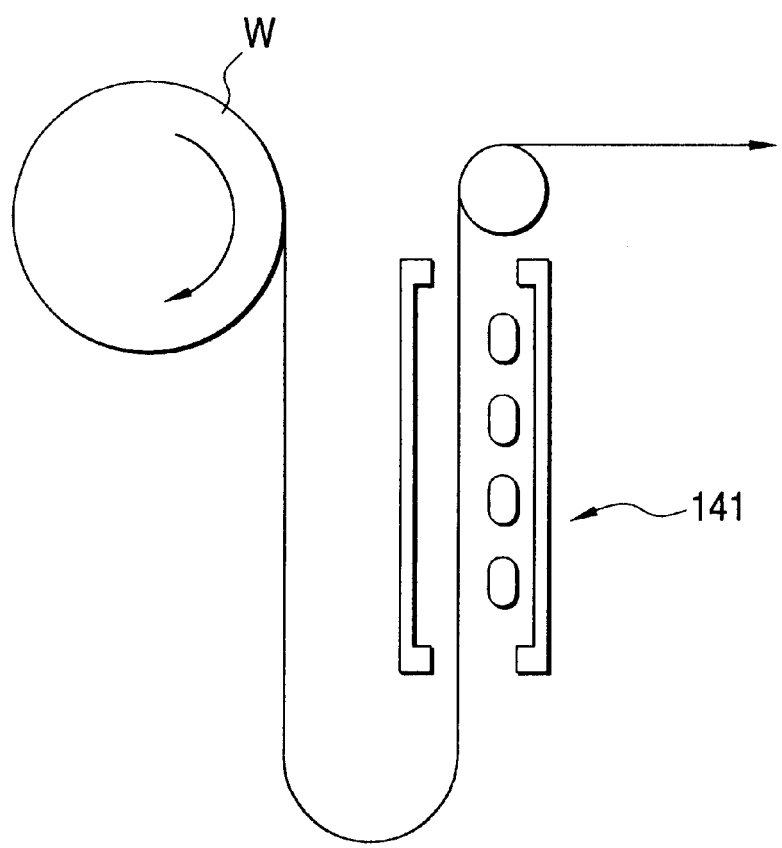
FIG. 7 is a schematic drawing of another example of a heating unit used in the third embodiment.

Heat treatment was conducted using a heating unit 141 equipped with an infrared ray heater (an infrared ray radiator) as shown in FIG. 7. While unwinding web W so as to synchronizing with the transporting rate, heating was performed using heating apparatus 141 so as not to apply tension to web W.

The results obtained are shown in Table 4 below.

TABLE A

| No. | Temperature of Web (° C.) | Processing Time (sec) | MD-TD (%) | Evaluation |
|---|---|---|---|---|
| 1 | 160 | 1.0 | 0.004 | ○ |
| 2 | 160 | 2.0 | 0.003 | ○ |
| 3 | 180 | 0.8 | 0.003 | ○ |

The following facts can be seen from the above Example/Comparative Example.

(1) Tension may approach zero unlimitedly, if industrially possible. For example, tension was not particularly applied in the laboratory tester in Example 3, but the actual tension applied was 85 g/m due to the self weight of the web.

(2) If temperature and processing time can be selected appropriately so as not to damage the web, processing conditions can be fixed without particularly limiting the upper bound provided that the temperature is 120° C. or more. However, from ordinary industrial restrictions (e.g., the stability of heating characteristics), it is appropriately about 200° C.

As described above, the effect of the present invention is apparent.

Moreover, the foregoing modes of executions are only a few of the examples and the present invention is not limited thereto.

For example, hot air and short wavelength infrared ray radiators were used as heating means of the web in Examples 3 and 4, but the present invention is not limited thereto. From medium wavelength infrared rays to far infrared rays, RF induction heating, microwaves and combinations of these can be used as well.

As explained in detail above, according to the producing method of a magnetic recording medium of the present invention, a magnetic recording medium having a low heat shrinkage factor and small anisotropy can be obtained by heat treatment by the tension of from 0.05 kg/m to 3.0 kg/m and the temperature of a web of from 120° C. to 220° C.

What is claimed is:

1. A method for producing a magnetic recording medium, comprising the steps of:

forming at least one magnetic layer on a nonmagnetic support by coating;

performing heat treatment by heat-treating said coated support at a temperature of 95 to 140° C. for 1.0 to 10.0 seconds while continuously applying tension of from 1.0 to 4.0 kg/m to said support, and then performing a calendering process at a calendering temperature lower than the temperature of said heat treatment, wherein the tension is applied at different values.

2. The method of producing a magnetic recording medium according to claim 1, wherein said heat treatment is conducted after all coating processes to form layers on said support have been completed.

3. A method for producing a magnetic recording medium, comprising the steps of:

forming a magnetic layer on a nonmagnetic support to form a web of a magnetic recording medium; and heat-treating the web;

wherein the heat-treating is carried out at a temperature from 120° C., to 220° C. while tension is applied to the web, the tension being within the range of from more than 0 kg/mg to 3.0 kg/m, wherein the tension is applied at different values, and calendering at a calendering temperature lower than the temperature of said heat-treating.

4. The method of producing a magnetic recording medium according to claim 1 or 3, wherein nonmagnetic support has at least one back coating layer.

5. The method of producing a magnetic recording medium according to claim 1 or 3, wherein the tension is applied with a draw system.

6. The method of producing a magnetic recording medium according to claim 5, wherein the tension is applied with a dancer system.

7. The method for producing a magnetic recording medium according to claim 3, wherein said magnetic recording medium is for a disc.

8. The method for producing a magnetic recording medium according to claim 3, wherein said heat treating is carried out by heated air.

9. The method for producing a magnetic recording medium according to claim 3, wherein at least a part of heat treating is carried out by infrared ray heating.

10. The method for producing a magnetic recording medium according to claim 3, wherein the tension applied to the web is from 0.05 kg/m to 3.0 kg/m.

11. The method of producing a magnetic recording medium according to claim 3, wherein said heat-treating is conducted while the web of a magnetic recording medium is traveling.

12. The method of producing a magnetic recording medium according to claim 3, wherein the heat-treating temperature is from 160 to 220° C. for 1.5 seconds or less and the tension is from 0.5 to 3.0 kg/m.

* * * * *